United States Patent
Suzuki et al.

(10) Patent No.: US 12,230,806 B2
(45) Date of Patent: Feb. 18, 2025

(54) NON-AQUEOUS ELECTROLYTE SECONDARY BATTERY

(71) Applicant: Prime Planet Energy & Solutions, Inc., Tokyo (JP)

(72) Inventors: Shinya Suzuki, Kobe (JP); Akira Tsujiko, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 465 days.

(21) Appl. No.: 17/679,108

(22) Filed: Feb. 24, 2022

(65) Prior Publication Data

US 2022/0271295 A1    Aug. 25, 2022

(30) Foreign Application Priority Data

Feb. 24, 2021 (JP) ................... 2021-027254

(51) Int. Cl.
| | |
|---|---|
| *H01M 4/62* | (2006.01) |
| *H01M 4/36* | (2006.01) |
| *H01M 4/505* | (2010.01) |
| *H01M 4/525* | (2010.01) |
| H01M 4/02 | (2006.01) |

(52) U.S. Cl.
CPC ........... *H01M 4/625* (2013.01); *H01M 4/366* (2013.01); *H01M 4/505* (2013.01); *H01M 4/525* (2013.01); *H01M 2004/021* (2013.01); *H01M 2004/028* (2013.01)

(58) Field of Classification Search
CPC ...... H01M 4/625; H01M 4/366; H01M 4/505; H01M 4/525; H01M 2004/021; H01M 2004/028; H01M 2300/0017; H01M 10/052; H01M 10/0525; Y02E 60/10
See application file for complete search history.

(56) References Cited

U.S. PATENT DOCUMENTS

| | | | |
|---|---|---|---|
| 2007/0122684 A1* | 5/2007 | Song .................. | H01M 4/861 |
| | | | 429/492 |
| 2008/0233477 A1* | 9/2008 | Takahashi ............ | H01M 4/621 |
| | | | 429/231.95 |
| 2012/0183851 A1* | 7/2012 | Hara .................. | H01M 4/5825 |
| | | | 429/211 |
| 2013/0288111 A1* | 10/2013 | An ..................... | H01M 4/625 |
| | | | 429/188 |
| 2018/0006291 A1* | 1/2018 | Kim .................... | H01M 4/13 |
| 2018/0062159 A1* | 3/2018 | El-Kady ............. | H01M 4/505 |

(Continued)

FOREIGN PATENT DOCUMENTS

JP    2018500714 A    1/2018

*Primary Examiner* — Abdullah A Riyami
*Assistant Examiner* — Nader J Alhawamdeh
(74) *Attorney, Agent, or Firm* — HAUPTMAN HAM, LLP (57) ABSTRACT

The positive electrode active material layer is placed on a surface of the positive electrode substrate. The positive electrode active material layer includes a first layer and a second layer. The first layer is interposed between the positive electrode substrate and the second layer. The positive electrode active material layer includes a positive electrode active material, carbon black, and fibrous carbon. A mass fraction of the carbon black in the first layer is higher than a mass fraction of the carbon black in the second layer. A mass fraction of the fibrous carbon in the second layer is higher than a mass fraction of the fibrous carbon in the first layer.

8 Claims, 2 Drawing Sheets

(56) References Cited

U.S. PATENT DOCUMENTS

| | | | |
|---|---|---|---|
| 2019/0221840 A1* | 7/2019 | Okuda | H01M 4/368 |
| 2020/0243851 A1* | 7/2020 | Takauji | H01M 4/13 |
| 2022/0271295 A1* | 8/2022 | Suzuki | H01M 4/625 |

* cited by examiner

NON-AQUEOUS ELECTROLYTE SECONDARY BATTERY

This nonprovisional application is based on Japanese Patent Application No. 2021-027254 filed on Feb. 24, 2021, with the Japan Patent Office, the entire contents of which are hereby incorporated by reference.

BACKGROUND OF THE INVENTION

Field of the Invention

The present technique relates to a non-aqueous electrolyte secondary battery.

Description of the Background Art

Japanese National Patent Publication No. 2018-500714 discloses an electrode having a multilayer structure.

SUMMARY OF THE INVENTION

Generally, a positive electrode active material of a non-aqueous electrolyte secondary battery (which may be simply called "battery" hereinafter) tends to have a low electron conductivity. Conventionally, in order to compensate for the low electron conductivity of a positive electrode active material, a conductive material such as carbon black is used.

Generally, a positive electrode active material is in particle form. Therefore, a positive electrode active material layer is porous. This is because the gaps between the particles are not completely filled. Into these pores inside the positive electrode active material layer, electrolyte solution permeates. The electrolyte solution can form ion conduction paths inside the positive electrode active material layer.

When carbon black is added to the positive electrode active material layer, electron conduction paths may be formed inside the positive electrode active material layer. However, because of it, ion conduction paths inside the positive electrode active material layer may be decreased. It seems that, in the surface portion of the positive electrode active material layer, pores are blocked by carbon black and thereby permeation of electrolyte solution is inhibited. In order to facilitate the permeation of electrolyte solution, the density of the surface portion may be reduced. However, when the density of the surface portion is low (that is, when the porosity of the surface portion is high), electron conduction paths in the surface portion tends to be less continuous.

The surface portion is close to a negative electrode. When the amount of ion conduction paths or electron conduction paths in the surface portion is not sufficient, charge-discharge reaction tends to occur disproportionately more in the surface portion. This disproportionate reaction may facilitate degradation of the positive electrode active material (such as particle breakage, for example). As a result, cycle endurance may be impaired.

In order to achieve both ion conduction paths and electron conduction paths, the porosity of the surface portion may be enhanced and also the amount of carbon black may be increased. However, an increase in porosity may cause a decrease in energy density, and carbon black does not substantially contribute to battery capacity. The increase in porosity and the increase in the amount of carbon black, in combination, may cause a decrease of energy density to a non-negligible extent.

An object of the technique according to the present application (herein also called "the present technique") is to achieve both cycle endurance and energy density.

Hereinafter, the configuration and effects of the present technique will be described it should be noted that the action mechanism according to the present specification includes presumption. The action mechanism does not limit the scope of the present technique.

[1] A non-aqueous electrolyte secondary battery comprises a positive electrode, a negative electrode, and an electrolyte solution.

The positive electrode includes a positive electrode substrate and a positive electrode active material layer. The positive electrode active material layer is placed on a surface of the positive electrode substrate. The positive electrode active material layer includes a first layer and a second layer. The first layer is interposed between the positive electrode substrate and the second layer.

The positive electrode active material layer includes a positive electrode active material, carbon black, and fibrous carbon. A mass fraction of the carbon black in the first layer is higher than a mass fraction of the carbon black in the second layer. In the first layer, the mass fraction of the carbon black relative to a mass of the positive electrode active material is from 1.5% to 5%. A mass fraction of the fibrous carbon in the second layer is higher than a mass fraction of the fibrous carbon in the first layer. In the second layer, the mass fraction of the fibrous carbon relative to a mass of the positive electrode active material is from 0.2% to 1%.

The positive electrode active material layer according to the present technique has a multilayer structure. More specifically, the positive electrode active material layer includes a first layer (lower layer) and a second layer (upper layer). The second layer may constitute a surface portion of the positive electrode active material layer.

The positive electrode active material layer includes two types of conductive material. More specifically, the positive electrode active material layer includes carbon black and fibrous carbon. Fibrous carbon may form an electron conduction path that is longer than that formed by carbon black. Fibrous carbon is distributed more in the second layer (upper layer). Therefore, it is expected that, even when the porosity of the second layer is increased to some extent, electron conduction paths tend not to be less continuous. That is, in the surface portion, both ion conduction paths and electron conduction paths are expected to be achieved.

However, when the mass fraction of fibrous carbon in an entire positive electrode active material layer increases, cycle endurance tends to decrease. Although the mechanism is not known in details, it seems that fibrous carbon works as a catalyst and facilitates metal elution from a positive electrode active material.

In the positive electrode active material layer according to the present technique where fibrous carbon is located more in the second layer (upper layer) and carbon black is the primary contributor to forming electron conduction paths in the first layer (lower layer), disproportionate occurrence of reaction in the upper layer is reduced and the mass fraction of fibrous carbon in the entire positive electrode active material layer is not too high. Therefore, with the present technique, cycle endurance is expected to be enhanced.

Further, fibrous carbon, even in a small amount, may be capable of forming a sufficient amount of electron conduction paths. By partially replacing carbon black by fibrous carbon, it is possible to reduce the total amount of the conductive material to be used. That is, with the present technique, it is possible to suppress a decrease in energy density that can be caused by adding conductive material.

As discussed above, with the present technique, both cycle endurance and energy density are expected to be achieved.

[2] In the first layer, the mass fraction of the fibrous carbon relative to the mass of the positive electrode active material may be 0.05% or less, for example. In the second layer, the mass fraction of the carbon black relative to the mass of the positive electrode active material may be 1% or less, for example.

With the configuration according to [2] above, at least one of cycle endurance and energy density is expected to be enhanced, for example.

[3] The first layer may have a porosity from 15% to 20%, for example. The second layer may have a porosity from 25% to 35%, for example.

With the configuration according to [3] above, at least one of cycle endurance and energy density is expected to be enhanced, for example.

[4] The ratio of a thickness of the second layer to a thickness of the first layer may be from 0.2 to 0.8, for example.

With the configuration according to [4] above, energy density is expected to be enhanced, for example. Hereinafter, "the ratio of a thickness of the second layer to a thickness of the first layer" is also called "thickness ratio", "T2/T1", or the like.

[5] The positive electrode active material may have a chemical composition represented by, for example, the following formula (I):

$$Li_{1-a}Ni_xMe_{1-x}O_2 \quad (I)$$

where "a" satisfies the relationship of $-0.3 \leq a \leq 0.3$, "x" satisfies the relationship of $0.7 \leq x \leq 1.0$, and "Me" denotes at least one selected from the group consisting of cobalt (Co), manganese (Mn), aluminum (Al), zirconium (Zr), boron (B), magnesium (Mg), iron (Fe), copper (Cu), zinc (Zn), tin (Sn), sodium (Na), potassium (K), barium (Ba), strontium (Sr), calcium (Ca), tungsten (W), molybdenum (Mo), niobium (Nb), titanium (Ti), silicon (Si), vanadium (V), chromium (Cr), and germanium (Ge).

The positive electrode active material having the chemical composition of the above formula (I) is called "high-nickel material", for example. It is because its amount-of-substance fraction of nickel (Ni) is high. A high-nickel material tends to have a high specific capacity. When a high-nickel material is used, energy density is expected to be enhanced. However, in a high-nickel material, reaction tends to occur disproportionately and thereby particle breakage tends to occur. This tendency becomes more noticeable as the amount-of-substance fraction of Ni becomes higher. It seems that the present technique is particularly effective for reducing particle breakage of a high-nickel material.

The foregoing and other objects, features, aspects and advantages of the present technique will become more apparent from the following detailed description of the present technique when taken in conjunction with the accompanying drawings.

DESCRIPTION OF THE PREFERRED EMBODIMENTS

Next, an embodiment of the present technique (herein also called "the present embodiment") will be described. It should be noted that the below description does not limit the scope of the present technique. For example, when functions and effects are mentioned herein, it does not limit the scope of the present technique to a certain configuration or configurations where all these functions and effects are exhibited.

Expressions such as "comprise, include" and "have", and other similar expressions (such as "be composed of", "encompass, involve", "contain", "carry, support", and "hold", for example) herein are open-ended expressions. In an open-ended expression, in addition to an essential component, an additional component may or may not be further included. The expression "consist of" is a closed-end expression. The expression "consist essentially of" is a semiclosed-end expression. In a semiclosed-end expression, an additional component may further be included in addition to an essential component, unless an object of the present technique is impaired. For example, a component that is usually expected to be included in the relevant field to which the present technique pertains (such as inevitable impurities, for example) may also be included as an additional component.

Expressions "may" and "can" herein are not intended to mean "must" (obligation) but rather mean "there is a possibility" (tolerance).

A singular form (a, an, the) also includes its plural meaning, unless otherwise specified. For example, "a particle" may include not only "one particle" but also "a group of particles (powder, particles)".

A numerical range such as "from 1.5% to 5%" and "from 1.5 to 5%" herein includes both the upper limit and the lower limit, unless otherwise specified. That is, "from 1.5% to 5%" and "from 1.5 to 5%" mean a numerical range of "not less than 1.5% and not more than 5%". Moreover, any numerical value selected from a certain numerical range may be used as a new upper limit and/or a new lower limit. For example, any numerical value from a certain numerical range may be combined with any numerical value described in another location of the present specification or in a table or a drawing, for example, to create a new numerical range.

In the present specification, when a compound is represented by a stoichiometric composition formula such as "LiCoO$_2$", for example, this stoichiometric composition formula is merely a typical example. Alternatively, the composition ratio may be non-stoichiometric. For example, when lithium cobalt oxide is represented as "LiCoO$_2$", the composition ratio of lithium cobalt oxide is not limited to "Li/Co/O=1/1/2" but Li, Co, and O may be included in any composition ratio, unless otherwise specified. Further, doping with a trace element and/or substitution is also tolerated.

Any geometric term herein (such as "parallel", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like.

The dimensional relationship in each figure may not necessarily coincide with the actual dimensional relationship. The dimensional relationship (in length, width, thickness, and the like) in each figure may have been changed for the purpose of assisting the understanding of the present technique. Further, a part of a configuration may have been omitted.

<Non-Aqueous Electrolyte Secondary Battery>

Figure 1:
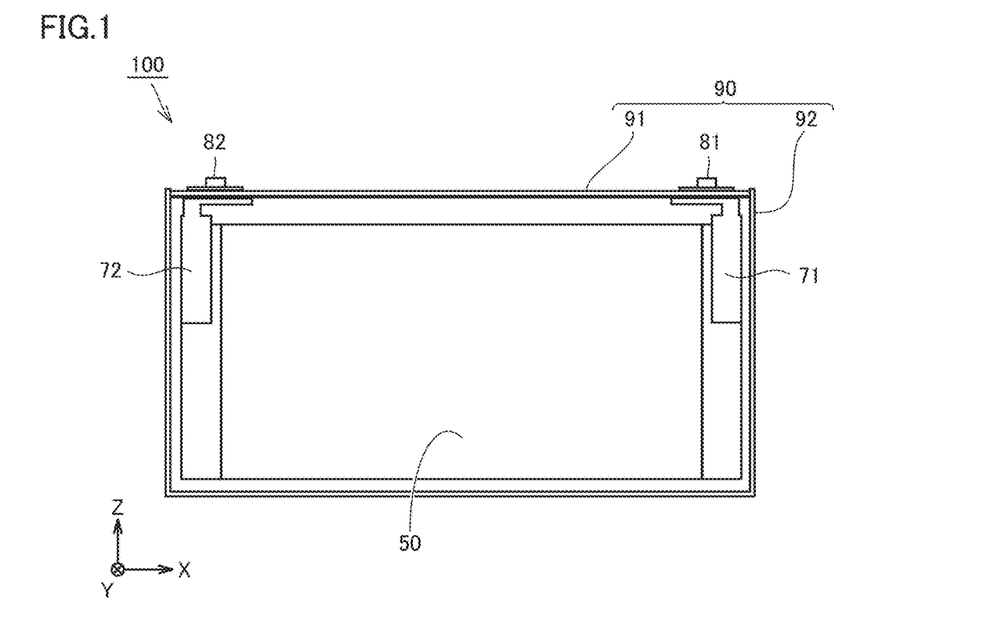
FIG. 1 is a schematic view illustrating an example configuration of a non-aqueous electrolyte secondary battery according to the present embodiment.

FIG. 1 is a schematic view illustrating an example configuration of a non-aqueous electrolyte secondary battery according to the present embodiment.

A battery 100 may be used for any purpose of use. For example, battery 100 may be used as a main electric power supply or a motive force assisting electric power supply in an electric vehicle. A plurality of batteries 100 may be connected together to form a battery module or a battery pack. Battery 100 may have a rated capacity from 1 Ah to 200 Ah, for example.

Battery 100 includes a housing 90. Housing 90 is prismatic (a flat, rectangular parallelepiped). However, prismatic is merely an example. Housing 90 may have any configuration. Housing 90 may be cylindrical or may be a pouch, for example. Housing 90 may be made of Al alloy, for example. Housing 90 accommodates an electrode assembly 50 and an electrolyte solution (not illustrated). Housing 90 may include a sealing plate 91 and an exterior can 92, for example. Sealing plate 91 closes an opening of exterior can 92. Sealing plate 91 and exterior can 92 may be bonded together by laser beam welding, for example.

Sealing plate 91 is provided with a positive electrode terminal 81 and a negative electrode terminal 82. Sealing plate 91 may further be provided with an inlet (not illustrated) and a gas-discharge valve (not illustrated). Through the inlet, the electrolyte solution may be injected into housing 90. Electrode assembly 50 is connected to positive electrode terminal 81 via a positive electrode current-collecting member 71. Positive electrode current-collecting member 71 may be an Al plate and/or the like, for example. Electrode assembly 50 is connected to negative electrode terminal 82 via a negative electrode current-collecting member 72. Negative electrode current-collecting member 72 may be a Cu plate and/or the like, for example.

Figure 2:
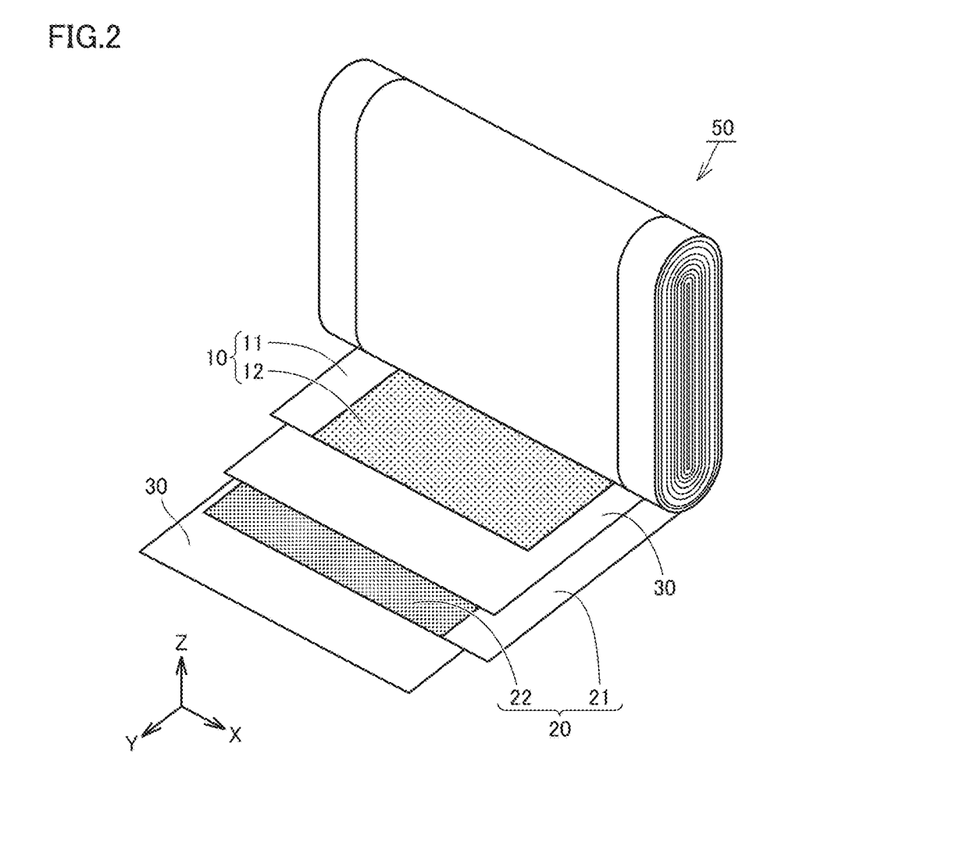
FIG. 2 is a schematic view illustrating an example configuration of an electrode assembly according to the present embodiment.

FIG. 2 is a schematic view illustrating an example configuration of an electrode assembly according to the present embodiment.

Electrode assembly 50 is a wound-type one. Electrode assembly 50 includes a positive electrode 10, a separator 30, and a negative electrode 20. In other words, battery 100 includes positive electrode 10, negative electrode 20, and an electrolyte solution. Each of positive electrode 10, separator 30, and negative electrode 20 is a belt-shaped sheet. Electrode assembly 50 may include a plurality of separators 30. Electrode assembly 50 is formed by stacking positive electrode 10, separator 30, and negative electrode 20 in this order and then winding them spirally. Positive electrode 10 or negative electrode 20 may be interposed between separators 30. Each of positive electrode 10 and negative electrode 20 may be interposed between separators 30. After the winding, electrode assembly 50 may be shaped into a flat form. The wound-type is merely an example. Electrode assembly 50 may be a stack-type one, for example <<Positive Electrode>>

Positive electrode 10 includes a positive electrode substrate 11 and a positive electrode active material layer 12. Positive electrode substrate 11 is a conductive sheet. Positive electrode substrate 11 may be an Al alloy foil and/or the like, for example. Positive electrode substrate 11 may have a thickness from 10 μm to 30 μm, for example Positive electrode active material layer 12 is placed on the surface of positive electrode substrate 11. Positive electrode active material layer 12 may be placed on only one side of positive electrode substrate 11, for example. Positive electrode active material layer 12 may be placed on both sides of positive electrode substrate 11, for example. From one end in a width direction (in the X-axis direction in FIG. 2) of positive electrode 10, positive electrode substrate 11 may be exposed. To the exposed portion of positive electrode substrate 11, positive electrode current-collecting member 71 may be bonded.

For example, an intermediate layer (not illustrated) may be formed between positive electrode active material layer 12 and positive electrode substrate 11. In the present embodiment, such a configuration including the intermediate layer is also regarded that positive electrode active material layer 12 is placed on a surface of positive electrode substrate 11. The intermediate layer may be thinner than positive electrode active material layer 12. The intermediate layer may have a thickness from 0.1 μm to 10 μm, for example. The intermediate layer may include a conductive material, an insulation material, and/or the like, for example.

(Positive Electrode Active Material Layer)

Positive electrode active material layer 12 may have a thickness from 10 μm to 200 μm, for example. Positive electrode active material layer 12 may have a thickness from 50 μm to 150 μm, for example. Positive electrode active material layer 12 may have a thickness from 50 μm to 100 μm, for example.

Positive electrode active material layer 12 may have an average density from 3.3 g/cm$^3$ to 3.8 g/cm$^3$, for example. Positive electrode active material layer 12 may have an average density from 3.5 g/cm$^3$ to 3.7 g/cm$^3$, for example. The average density of positive electrode active material layer 12 herein is determined by dividing the mass of positive electrode active material layer 12 by the apparent volume of positive electrode active material layer 12. The average density is measured in a specimen that is cut out from positive electrode 10. The specimen may have planar sizes of about 10 cm$^2$, for example. The density of positive electrode active material layer 12 may vary depending on the position.

Positive electrode active material layer 12 includes a positive electrode active material and a conductive material. The conductive material includes carbon black and fibrous carbon. That is, positive electrode active material layer 12 includes a positive electrode active material, carbon black, and fibrous carbon. Positive electrode active material layer 12 may further include a binder and/or the like, for example. For example, positive electrode active material layer 12 may consist essentially of the binder in a mass fraction from 0.1 to 10%, the conductive material in a mass fraction from 0.1 to 10%, and the remainder being made up of the positive electrode active material.

(Positive Electrode Active Material)

The positive electrode active material is in particle form. The positive electrode active material may have any size. The positive electrode active material may have a D50 from 1 μm to 30 μm, for example. The "D50" herein is defined as a particle size in volume-based particle size distribution at which cumulative frequency accumulated from the small particle size side reaches 50%. The volume-based particle size distribution may be obtained by measurement with a laser-diffraction particle size distribution analyzer.

The positive electrode active material is capable of reversibly occluding and releasing lithium ions. The positive electrode active material may have any crystal structure. The positive electrode active material may have a lamellar-rock-salt-type structure, a spinel-type structure, an olivine-type structure, and/or the like, for example.

The positive electrode active material may have any chemical composition. The chemical composition of the positive electrode active material may be determined by measurement by ICP-AES (inductively coupled plasma-atomic emission spectrometry) and/or the like, for example.

The positive electrode active material may have a chemical composition represented by, for example, the following formula (I):

$$Li_{1-a}Ni_xMe_{1-x}O_2 \qquad (I)$$

where "a" satisfies the relationship of $-0.3 \leq a \leq 0.3$, "x" satisfies the relationship of $0.7 \leq x \leq 1.0$, and "Me" denotes at least one selected from the group consisting of Co, Mn, Al, Zr, B, Mg, Fe, Cu, Zn, Sn, Na, K, Ba, Sr, Ca, W, Mo, Nb, Ti, Si, V, Cr, and Ge.

The positive electrode active material may have a chemical composition represented by, for example, the following formula (II):

$$Li_{1-a}Ni_xCo_yMn_{1-x-y}O_2 \qquad (II)$$

where "a" satisfies the relationship of $-0.3 \leq a \leq 0.3$, "x" satisfies the relationship of $0.7 \leq x \leq 1.0$, and "y" satisfies the relationship of $0 \leq y \leq 0.3$.

The positive electrode active material may include, for example, at least one selected from the group consisting of $LiNiO_2$, $LiNi_{0.9}Co_{0.1}O_2$, $LiNi_{0.9}Mn_{0.1}O_2$, $LiNi_{0.8}Co_{0.1}Mn_{0.1}O_2$, $LiNi_{0.7}Co_{0.2}Mn_{0.1}O_2$, $LiNi_{0.7}Co_{0.7}Mn_{0.2}O_2$, $LiNi_{0.6}Co_{0.3}Mn_{0.1}O_2$, $LiNi_{0.6}Co_{0.2}Mn_{0.2}O_2$, $LiNi_{0.6}Co_{0.1}Mn_{0.3}O_2$, $LiNi_{0.5}Co_{0.3}Mn_{0.2}O_2$, $LiNi_{0.5}Co_{0.2}Mn_{0.3}O_2$, $LiNi_{0.5}Co_{0.1}Mn_{0.4}O_2$, and $LiNi_{0.5}Co_{0.4}Mn_{0.1}O_2$.

The positive electrode active material may include, for example, at least one selected from the group consisting of $LiNi_{0.8}Co_{0.1}Mn_{0.1}O_2$, $LiNi_{0.7}Co_{0.2}Mn_{0.1}O_2$, and $LiNi_{0.6}Co_{0.2}Mn_{0.2}O_2$.

(Carbon Black)

Carbon black is a conductive material. Carbon black is electronically conductive. Carbon black is aggregated fine particles. Carbon black is an amorphous carbon. Carbon black may consist essentially of carbon. Carbon black may include, for example, at least one selected from the group consisting of acetylene black, Ketjenblack (registered trademark), furnace black, channel black, and thermal black.

(Fibrous Carbon)

Fibrous carbon herein may have a diameter from 0.1 nm to 1 μm and a length at least 100 times the diameter. Fibrous carbon may have a diameter from 0.5 nm to 20 nm, or may have a diameter from 5 nm to 15 nm, for example. Fibrous carbon may have a length of 1 μm or more, or may have a length of 10 μm or more, for example. Fibrous carbon may have a length of 500 μm or less, or may have a length of 100 μm or less, for example. The diameter and the length of fibrous carbon may be measured with an SEM (scanning electron microscope), a TEM (transmission electron microscope), and/or the like, for example. Each of the diameter and the length may be the arithmetic mean of 100 or more fibrous carbons.

Fibrous carbon is a conductive material. Fibrous carbon is electronically conductive. Fibrous carbon may consist essentially of carbon. Fibrous carbon may be partially or entirely graphitized. Fibrous carbon may include, for example, at least one selected from the group consisting of carbon nanotubes (CNT), vapor grown carbon fibers (VGCF), polyacrylonitrile-based (PAN-based) carbon fibers, and pitch-based carbon fibers.

(Binder)

The binder may include an optional component. The binder may include, for example, at least one selected from the group consisting of polyvinylidene difluoride (PVdF), poly(vinylidenefluoride-co-hexafluoropropylene) (PVdF-HFP), polytetrafluoroethylene (PTFE), and polyacrylic acid (PAA).

<<Multilayer Structure>>

Figure 3:
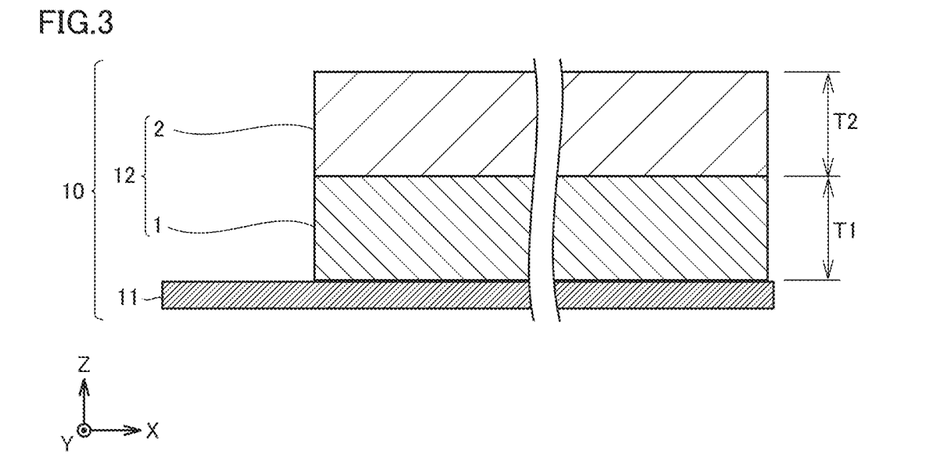
FIG. 3 is a schematic cross-sectional view illustrating an example of a positive electrode according to the present embodiment.

FIG. 3 is a schematic cross-sectional view illustrating an example of a positive electrode according to the present embodiment.

Positive electrode active material layer 12 has a multi-layer structure. That is, positive electrode active material layer 12 includes a first layer 1 and a second layer 2. First layer 1 is interposed between positive electrode substrate 11 and second layer 2.

As long as it includes first layer 1 and second layer 2, positive electrode active material layer 12 may include an additional layer (not illustrated). The additional layer has a composition that is different from those of first layer 1 and second layer 2. For example, an additional layer may be formed between first layer 1 and second layer 2. For example, an additional layer may be formed between first layer 1 and positive electrode substrate 11. For example, an additional layer may be formed between a surface of positive electrode active material layer 12 and second layer 2.

Second layer 2 is, in other words, an "upper layer". Second layer 2 is placed closer to the surface of positive electrode active material layer 12 than first layer 1 is. Second layer 2 may be exposed from the surface of positive electrode active material layer 12. Second layer 2 may constitute the surface of positive electrode active material layer 12. First layer 1 is, in other words, a "lower layer". First layer 1 is placed closer to positive electrode substrate 11 than second layer 2 is. First layer 1 may be in contact with the surface of positive electrode substrate 11. First layer 1 may be formed on the surface of positive electrode substrate 11.

(Composition of Conductive Material in Thickness Direction)

Second layer 2 has a different composition of conductive material from first layer 1. Each of the mass fraction of fibrous carbon and the mass fraction of carbon black in each layer is a value relative to the mass of the positive electrode active material in that layer. For example, the total mass of fibrous carbon included in second layer 2 is divided by the total mass of the positive electrode active material included in second layer 2 to determine the mass fraction (percentage) of fibrous carbon in second layer 2.

Fibrous carbon is distributed more in second layer 2 (upper layer) than in first layer 1 (lower layer). In other words, the mass fraction of fibrous carbon in second layer 2 is higher than the mass fraction of fibrous carbon in first layer 1. The mass fraction of fibrous carbon in second layer 2 is from 0.2% to 1%. The mass fraction of fibrous carbon in second layer 2 may be from 0.4% to 0.8%, for example.

The ratio of the mass fraction of fibrous carbon in first layer 1 to the mass fraction of fibrous carbon in second layer 2 may be from 0 to 0.25, for example. The ratio of the mass fraction of fibrous carbon in first layer 1 to the mass fraction of fibrous carbon in second layer 2 may be from 0 to 0.1, for example.

Second layer 2 may or may not include carbon black, for example. The mass fraction of carbon black in second layer 2 may be 1% or less, for example. With this configuration, energy density is expected to be enhanced, for example. The mass fraction of carbon black in second layer 2 may be from 0% to 0.5%, for example.

Carbon black is distributed more in first layer 1 (lower layer) than in second layer 2 (upper layer). In other words, the mass fraction of carbon black in first layer 1 is higher than the mass fraction of carbon black in second layer 2. The mass fraction of carbon black in first layer 1 is from 1.5% to 5%. The mass fraction of carbon black in first layer 1 may be from 2% to 4%, for example.

The ratio of the mass fraction of carbon black in second layer 2 to the mass fraction of carbon black in first layer 1 may be from 0 to 0.7, for example. The ratio of the mass fraction of carbon black in second layer 2 to the mass fraction of carbon black in first layer 1 may be from 0 to 0.3, for example.

First layer 1 may or may not include fibrous carbon, for example. The mass fraction of fibrous carbon in first layer 1 may be 0.05% or less, for example. With this configuration, cycle endurance is expected to be enhanced, for example. The mass fraction of fibrous carbon in first layer 1 may be from 0% to 0.05%, or may be from 0% to 0.02%, or may be from 0.02% to 0.05%, for example.

(Method for Measuring Composition of Conductive Material)

The composition of conductive material may be measured by TG-DTA (thermogravimetry-differential thermal analysis). Firstly, a predetermined area of positive electrode active material layer 12 is taken. From the predetermined area of positive electrode active material layer 12, a powder sample is prepared. The powder sample may weigh about 0.01 g. Measurement is carried out to obtain a TG-DTA curve for the powder sample. The measurement is carried out in an air atmosphere. The temperature raising rate may be about 5° C./min. From the amount of mass loss from the vicinity of 100° C. to the vicinity of 400° C. on the TG-DTA curve, the mass fraction of carbon black in the entire positive electrode active material layer 12 is determined. From the amount of mass loss from the vicinity of 400° C. to the vicinity of 700° C. on the TG-DTA curve, the mass fraction of fibrous carbon in the entire positive electrode active material layer 12 is determined.

Then, second layer 2 (upper layer) is separated from positive electrode active material layer 12 with the use of adhesive tape and/or the like. The adhesive tape may be a kapton tape and/or the like, for example. From the remaining portion of positive electrode active material layer 12 (namely, first layer 1), a powder sample is prepared. According to the above-described procedure, measurement is carried out to obtain a TG-DTA curve. Thus, the mass fraction of carbon black in first layer 1 and the mass fraction of fibrous carbon in first layer 1 are determined.

The mass fraction of carbon black in first layer 1 is subtracted from the mass fraction of carbon black in the entire positive electrode active material layer 12 to determine the mass fraction of carbon black in second layer 2. The mass fraction of fibrous carbon in first layer 1 is subtracted from the mass fraction of fibrous carbon in the entire positive electrode active material layer 12 to determine the mass fraction of fibrous carbon in second layer 2.

(Porosity)

First layer 1 and second layer 2 may have different porosities. For example, the porosity of second layer 2 (upper layer) may be higher than that of first layer 1 (lower layer). With this configuration, at least one of cycle endurance and energy density is expected to be enhanced, for example.

Second layer 2 may have a porosity of 23.5% or more, for example. Second layer 2 may have a porosity from 25% to 35%, for example. Second layer 2 may have a porosity of 27.9% or less, for example.

First layer 1 may have a porosity of 22% or less, for example. First layer 1 may have a porosity from 15% to 20%, for example. First layer 1 may have a porosity of 17.1% or more, for example.

The porosity of each layer is measured in a cross-sectional SEM image of positive electrode active material layer 12. The cross-sectional SEM image is captured from a cross section parallel to the thickness direction of positive electrode active material layer 12. The cross-sectional SEM image is binarized to differentiate pores from other part. The area fraction of pores in first layer 1 is regarded as the porosity of first layer 1. In other words, the porosity is determined by dividing the total area of pores in first layer 1 by the total area of first layer 1. In the same manner as for first layer 1, the porosity of second layer 2 is also determined. The porosity is measured in each of five or more cross-sectional SEM images. The arithmetic mean from these five or more cross-sectional SEM images is adopted.

The porosity of each layer may be adjusted by the below procedure, for example. A first slurry is applied to a surface of positive electrode substrate 11, followed by drying, and thereby, first layer 1 is formed. First layer 1 is compressed with a rolling mill and/or the like, for example, into a predetermined density. To a surface of first layer 1 after compression, a second slurry is applied, followed by drying, and thereby, second layer 2 is formed. Second layer 2 is compressed with a rolling mill and/or the like, for example, into a predetermined density. Compressing first layer 1 and second layer 2 into different densities makes it possible to adjust the porosity of the layers. For example, the layers may be compressed in a manner such that the density of second layer 2 is lower than that of first layer 1. With this configuration, the porosity of second layer 2 may be higher than that of first layer 1.

(Thickness Ratio)

The thickness ratio (T2/T1) is determined by dividing the thickness of second layer 2, T2, by the thickness of first layer 1, T1. The thickness ratio may be from 0.2 to 0.8, for example. When the thickness ratio is from 0.2 to 0.8, energy density is expected to be enhanced. The thickness ratio may be from 0.3 to 0.5, for example. The thickness of each layer is measured in a cross-sectional SEM image of positive electrode active material layer 12. The cross-sectional SEM image is captured in a cross section parallel to the thickness direction of positive electrode active material layer 12. The thickness of each layer is measured at five or more positions. The arithmetic mean of the thicknesses at these five or more positions is adopted (Composition of Positive Electrode Active Material in Thickness Direction)

Second layer 2 may include the same positive electrode active material as that of first layer 1, for example. Second layer 2 may include a different positive electrode active material from that of first layer 1, for example. When the chemical composition of the positive electrode active material is represented by the above formula (I) or (II), for example, "x (the amount-of-substance fraction of Ni)" of the positive electrode active material included in second layer 2 may be less than that of the positive electrode active material included in first layer 1. With this configuration, even when reaction occurs in second layer 2 (upper layer) in a moderately disproportionate manner, for example, degradation of the positive electrode active material (particle breakage) is expected to be suppressed.

In second layer 2, "x" in the above formula (I) or (II) may satisfy the relationship of $0.75 \leq x < 0.8$, for example. In second layer 2, "x" in the above formula (I) or (II) may satisfy the relationship of $0.7 \leq x \leq 0.75$, for example. In first layer 1, "x" in the above formula (I) or (II) may satisfy the relationship of $0.8 \leq x \leq 1.0$, for example. In first layer 1, "x" in the above formula (I) or (II) may satisfy the relationship of $0.85 \leq x \leq 1.0$, for example <<Negative Electrode>>

Negative electrode 20 may include a negative electrode substrate 21 and a negative electrode active material layer 22, for example. Negative electrode substrate 21 is a conductive sheet. Negative electrode substrate 21 may be a Cu alloy foil and/or the like, for example. Negative electrode substrate 21 may have a thickness from 5 μm to 30 μm, for example. Negative electrode active material layer 22 may be placed on the surface of negative electrode substrate 21. Negative electrode active material layer 22 may be placed on only one side of negative electrode substrate 21, for example. Negative electrode active material layer 22 may be placed on both sides of negative electrode substrate 21, for example. From one end in a width direction (in the X-axis direction in FIG. 2) of negative electrode 20, negative electrode substrate 21 may be exposed. To the exposed portion of negative electrode substrate 21, negative electrode current-collecting member 72 may be bonded.

Negative electrode active material layer 22 may have a thickness from 10 μm to 200 μm, for example. Negative electrode active material layer 22 includes a negative electrode active material. The negative electrode active material may include an optional component. The negative electrode active material may include, for example, at least one selected from the group consisting of graphite, soft carbon, hard carbon, Si, SiO, Si-based alloy, Sn, SnO, Sn-based alloy, and $Li_4Ti_5O_{12}$.

In addition to the negative electrode active material, negative electrode active material layer 22 may further include a binder and/or the like, for example. For example, negative electrode active material layer 22 may consist essentially of the binder in a mass fraction from 0.1 to 10% and the remainder being made up of the negative electrode active material. The binder may include an optional component. The binder may include, for example, at least one selected from the group consisting of carboxymethylcellulose (CMC) and styrene-butadiene rubber (SBR).

<<Separator>>

At least part of separator 30 is interposed between positive electrode 10 and negative electrode 20. Separator 30 separates positive electrode 10 from negative electrode 20. Separator 30 may have a thickness from 10 μm to 30 μm, for example.

Separator 30 is a porous sheet. Separator 30 allows for permeation of the electrolyte solution therethrough. Separator 30 may have an air permeability from 100 s/100 mL to 400 s/100 mL, for example. The "air permeability" herein refers to the "air resistance" defined by "JIS P 8117:009". The air permeability is measured by a Gurley test method.

Separator 30 is electrically insulating. Separator 30 may include a polyolefin-based resin and/or the like, for example. Separator 30 may consist essentially of a polyolefin-based resin, for example. The polyolefin-based resin may include, for example, at least one selected from the group consisting of polyethylene (PE) and polypropylene (PP). Separator 30 may have a monolayer structure, for example Separator 30 may consist essentially of a PE layer, for example. Separator 30 may have a multilayer structure, for example. Separator 30 may be formed, for example, by stacking a PP layer, a PE layer, and a PP layer in this order. On a surface of separator 30, a heat-resistant layer (a ceramic particle layer) and/or the like may be formed, for example.

<<Electrolyte Solution>>

The electrolyte solution includes a solvent and a supporting electrolyte. The solvent is aprotic. The solvent may include an optional component. The solvent may include, for example, at least one selected from the group consisting of ethylene carbonate (EC), propylene carbonate (PC), butylene carbonate (BC), dimethyl carbonate (DMC), ethyl methyl carbonate (EMC), diethyl carbonate (DEC), 1,2-dimethoxyethane (DME), methyl formate (MF), methyl acetate (MA), methyl propionate (MP), and γ-butyrolactone (GBL).

The supporting electrolyte is dissolved in the solvent. The supporting electrolyte may include, for example, at least one selected from the group consisting of $LiPF_6$, $LiBF_4$, and $LiN(FSO_2)_2$. The supporting electrolyte may have a molarity from 0.5 mol/L to 2.0 mol/L, for example. The supporting electrolyte may have a molarity from 0.8 mol/L to 1.2 mol/L, for example.

In addition to the solvent and the supporting electrolyte, the electrolyte solution may further include an optional additive. For example, the electrolyte solution may include an additive in a mass fraction from 0.01% to 5%. The additive may include, for example, at least one selected from the group consisting of vinylene carbonate (VC), lithium difluorophosphate ($LiPO_2F_2$), lithium fluorosulfonate ($FSO_3Li$), and lithium bis(oxalato)borate (LiBOB).

EXAMPLES

Next, examples according to the present technique (also called "the present example" herein) will be described. It should be noted that the below description does not limit the scope of the present technique.

<Production of Positive Electrode>

<<No. 1>>

The below materials were prepared.

Positive electrode active material: $LiNi_{0.8}Co_{0.1}Mn_{0.1}O_2$
Fibrous carbon: CNT
Carbon black: acetylene black
Binder: PVdF (powder)
Dispersion medium: N-methyl-2-pyrrolidone
Positive electrode substrate: Al foil 100 parts by mass of the positive electrode active material, 0.05 parts by mass of the fibrous carbon, 4 parts by mass of the carbon black, 0.9 parts by mass of the binder, and the dispersion medium were mixed to prepare a first slurry. The first slurry was applied to a surface of the positive electrode substrate, followed by drying, and thereby, a first layer was formed. The first layer was compressed with a rolling mill. The first layer after compression had a density of 3.7 g/cm³.

100 parts by mass of the positive electrode active material, 0.8 parts by mass of the fibrous carbon, 1 part by mass of the carbon black, 0.9 parts by mass of the binder, and the dispersion medium were mixed to prepare a second slurry. The second slurry was applied to a surface of the first layer, followed by drying, and thereby, a second layer was formed. The second layer was compressed with a rolling mill. The second layer after compression had a density of 3.5 g/cm³. Thus, a positive electrode active material layer was formed. The thickness ratio (T2/T1) was 1.0. In the same manner, another positive electrode active material layer was formed on the back side of the positive electrode substrate. Thus, a positive electrode according to No. 1 was produced.

<<No. 2 to No. 15>>

Each positive electrode was produced in the same manner as for the positive electrode according to No. 1 except that the compositions of the conductive material for the first layer and the second layer were changed (see Table 1 below). Positive electrode active material layers according to No. 8 and No 9 are monolayered. Positive electrode active material layers derived from other samples are double-layered.

<<No. 16, No. 17>>

Each positive electrode was produced in the same manner as for the positive electrode according to No. 15 except that the thickness ratio was changed (see Table 1 below).

<<No. 18, No. 19>

Each positive electrode was produced in the same manner as for the positive electrode according to No. 1 except that the chemical composition of the positive electrode active material was changed (see Table 1 below).

Evaluation

A test battery (a non-aqueous electrolyte secondary battery) including the positive electrode produced in the above manner was fabricated. The initial discharged capacity of the test battery was measured. From the initial discharged capacity, energy density of the test battery was determined.

The test battery was subjected to charge-discharge cycles. The discharged capacity of the 300th cycle was divided by the discharged capacity of the $1^{st}$ cycle to determine capacity retention.

17, when the capacity retention of the 300th cycle is 72.2% or more and the energy density is 635 Wh/L or more, it is considered that both cycle endurance and energy density are achieved.

In the test batteries according to No. 1 to No. 3 and No. 11 to No. 17, both cycle endurance and energy density are achieved. Each of these test batteries satisfies the conditions (a) to (e) described below.

(a) The positive electrode active material layer has a multilayer structure.
(b) The mass fraction of carbon black in the first layer is higher than the mass fraction of carbon black in the second layer.
(c) The mass fraction of carbon black in the first layer is from 1.5% to 5%.
(d) The mass fraction of fibrous carbon in the second layer is higher than the mass fraction of fibrous carbon in the first layer.
(e) The mass fraction of fibrous carbon in the second layer is from 0.2% to 1%.

In the test batteries according to No. 4 to No. 10, at least one of cycle endurance and energy density is not achieved. These test batteries fail to satisfy at least one of the above conditions (a) to (e).

The test batteries according to No. 15 to No. 17 demonstrate a tendency that energy density is enhanced as the thickness ratio decreases.

The test batteries according to No. 1, No. 18, and No. 19 demonstrate a tendency that energy density is enhanced as "x" of the positive electrode active material (general formula: $LiNi_xCo_yMn_{1-x-y}O_2$) increases, as well as a tendency

TABLE 1

| | Positive electrode active material layer | | | | | | | Evaluation | |
| | | Conductive material | | | | | Thickness ratio | Cycle endurance | |
| | Positive electrode | Second layer | | First layer | | Porosity | (T2/T1) | 300cyc | |
| | active material | (upper layer) | | (lower layer) | | Second | First | Second layer/ | capacity | Energy |
| No. | $LiNi_xCo_yMn_{1-x-y}O_2$ x/y/(1-x-y) | CNT [%] | AB [%] | CNT [%] | AB [%] | layer [%] | layer [%] | First layer [-] | retention [%] | density [Wh/L] |
|---|---|---|---|---|---|---|---|---|---|---|
| 1 | 0.8/0.1/0.1 | 0.8 | 1.0 | 0.05 | 4.0 | 23.8 | 20.8 | 1.0 | 73.2 | 635 |
| 2 | 0.8/0.1/0.1 | 0.4 | 1.0 | 0.05 | 4.0 | 23.6 | 20.8 | 1.0 | 72.6 | 635 |
| 3 | 0.8/0.1/0.1 | 0.8 | 1.0 | 0.05 | 2.0 | 23.9 | 20.6 | 1.0 | 72.2 | 640 |
| 4 | 0.8/0.1/0.1 | 0.8 | 1.0 | 0.05 | 5.5 | 24.2 | 21.4 | 1.0 | 73.1 | 600 |
| 5 | 0.8/0.1/0.1 | 2.0 | 1.0 | 0.05 | 4.0 | 23.5 | 20.8 | 1.0 | 68.5 | 630 |
| 6 | 0.8/0.1/0.1 | — | 4.0 | — | 4.0 | 25.3 | 20.3 | 1.0 | 69.1 | 580 |
| 7 | 0.8/0.1/0.1 | 0.8 | — | 0.8 | — | 24.1 | 21.1 | 1.0 | 69.0 | 645 |
| 8 | 0.8/0.1/0.1 | 0.8 | 1.0 | 0.8 | 1.0 | 22.6 | 22.6 | Monolayer | 68.3 | 640 |
| 9 | 0.8/0.1/0.1 | 0.05 | 4.0 | 0.05 | 4.0 | 21.2 | 21.2 | Monolayer | 68.1 | 585 |
| 10 | 0.8/0.1/0.1 | 0.05 | 4.0 | 0.8 | 1.0 | 22.1 | 20.4 | 1.0 | 68.8 | 625 |
| 11 | 0.8/0.1/0.1 | 0.8 | 0.5 | 0.05 | 4.0 | 23.4 | 20.8 | 1.0 | 73.4 | 645 |
| 12 | 0.8/0.1/0.1 | 0.8 | 0.5 | 0.02 | 4.0 | 23.8 | 21.2 | 1.0 | 76.0 | 645 |
| 13 | 0.8/0.1/0.1 | 0.8 | 0 | 0 | 4.0 | 23.6 | 20.5 | 1.0 | 76.5 | 650 |
| 14 | 0.8/0.1/0.1 | 0.8 | 0.5 | 0.02 | 4.0 | 27.5 | 21.2 | 1.0 | 77.1 | 635 |
| 15 | 0.8/0.1/0.1 | 0.8 | 0.5 | 0.02 | 4.0 | 27.9 | 17.9 | 1.0 | 76.9 | 645 |
| 16 | 0.8/0.1/0.1 | 0.8 | 0.5 | 0.02 | 4.0 | 27.1 | 17.3 | 0.5 | 76.6 | 660 |
| 17 | 0.8/0.1/0.1 | 0.8 | 0.5 | 0.02 | 4.0 | 27.8 | 17.1 | 0.3 | 76.6 | 670 |
| 18 | 0.6/0.2/0.2 | 0.8 | 1.0 | 0.05 | 4.0 | 23.7 | 21.1 | 1.0 | 85.3 | 550 |
| 19 | 0.7/0.2/0.1 | 0.8 | 1.0 | 0.05 | 4.0 | 23.9 | 22.0 | 1.0 | 80.4 | 575 |

Results

The test batteries according to No. 1 to No. 17 had the same chemical composition of the positive electrode active material. As for the test batteries according to No. 1 to No.

that cycle endurance is enhanced as "x" decreases. It seems that both cycle endurance and energy density are also achieved in No. 18 and No. 19.

The present embodiment and the present example are illustrative in any respect. The present embodiment and the present example are non-restrictive. The scope of the present technique encompasses any modifications within the meaning and the scope equivalent to the terms of the claims. For example, it is expected that certain configurations of the present embodiments and the present examples can be optionally combined.

What is claimed is:

1. A non-aqueous electrolyte secondary battery comprising:
   a positive electrode;
   a negative electrode; and
   an electrolyte solution, wherein
   the positive electrode includes a positive electrode substrate and a positive electrode active material layer,
   the positive electrode active material layer is placed on a surface of the positive electrode substrate,
   the positive electrode active material layer includes a first layer and a second layer,
   the first layer is interposed between the positive electrode substrate and the second layer,
   the positive electrode active material layer includes a positive electrode active material, carbon black, and fibrous carbon,
   a mass fraction of the carbon black in the first layer is higher than a mass fraction of the carbon black in the second layer,
   in the first layer, the mass fraction of the carbon black relative to a mass of the positive electrode active material is from 1.5% to 5%,
   a mass fraction of the fibrous carbon in the second layer is higher than a mass fraction of the fibrous carbon in the first layer, and
   in the second layer, the mass fraction of the fibrous carbon relative to a mass of the positive electrode active material is from 0.2% to 1%.

2. The non-aqueous electrolyte secondary battery according to claim 1, wherein
   in the first layer, the mass fraction of the fibrous carbon relative to the mass of the positive electrode active material is 0.05% or less, and
   in the second layer, the mass fraction of the carbon black relative to the mass of the positive electrode active material is 1% or less.

3. The non-aqueous electrolyte secondary battery according to claim 1, wherein
   the first layer has a porosity from 15% to 20%, and
   the second layer has a porosity from 25% to 35%.

4. The non-aqueous electrolyte secondary battery according to claim 1, wherein a ratio of a thickness of the second layer to a thickness of the first layer is from 0.2 to 0.8.

5. The non-aqueous electrolyte secondary battery according to claim 1, wherein
   the positive electrode active material has a chemical composition represented by a formula (I): $Li_{1-a}Ni_xMe_{1-x}O_2$ ... (I)
   where
   a satisfies a relationship of $-0.3 \leq a \leq 0.3$,
   x satisfies a relationship of $0.7 \leq x \leq 1.0$, and
   Me denotes at least one selected from the group consisting of Co, Mn, Al, Zr, B, Mg, Fe, Cu, Zn, Sn, Na, K, Ba, Sr, Ca, W, Mo, Nb, Ti, Si, V, Cr, and Ge.

6. The non-aqueous electrolyte secondary battery according to claim 1, wherein the fibrous carbon is distributed throughout the second layer.

7. The non-aqueous electrolyte secondary battery according to claim 1, wherein the positive electrode active material is distributed throughout the positive electrode active material layer.

8. The non-aqueous electrolyte secondary battery according to claim 1, wherein a mass fraction of the positive electrode active material is 80% or more throughout the positive electrode active material layer.

* * * * *